UNITED STATES PATENT OFFICE.

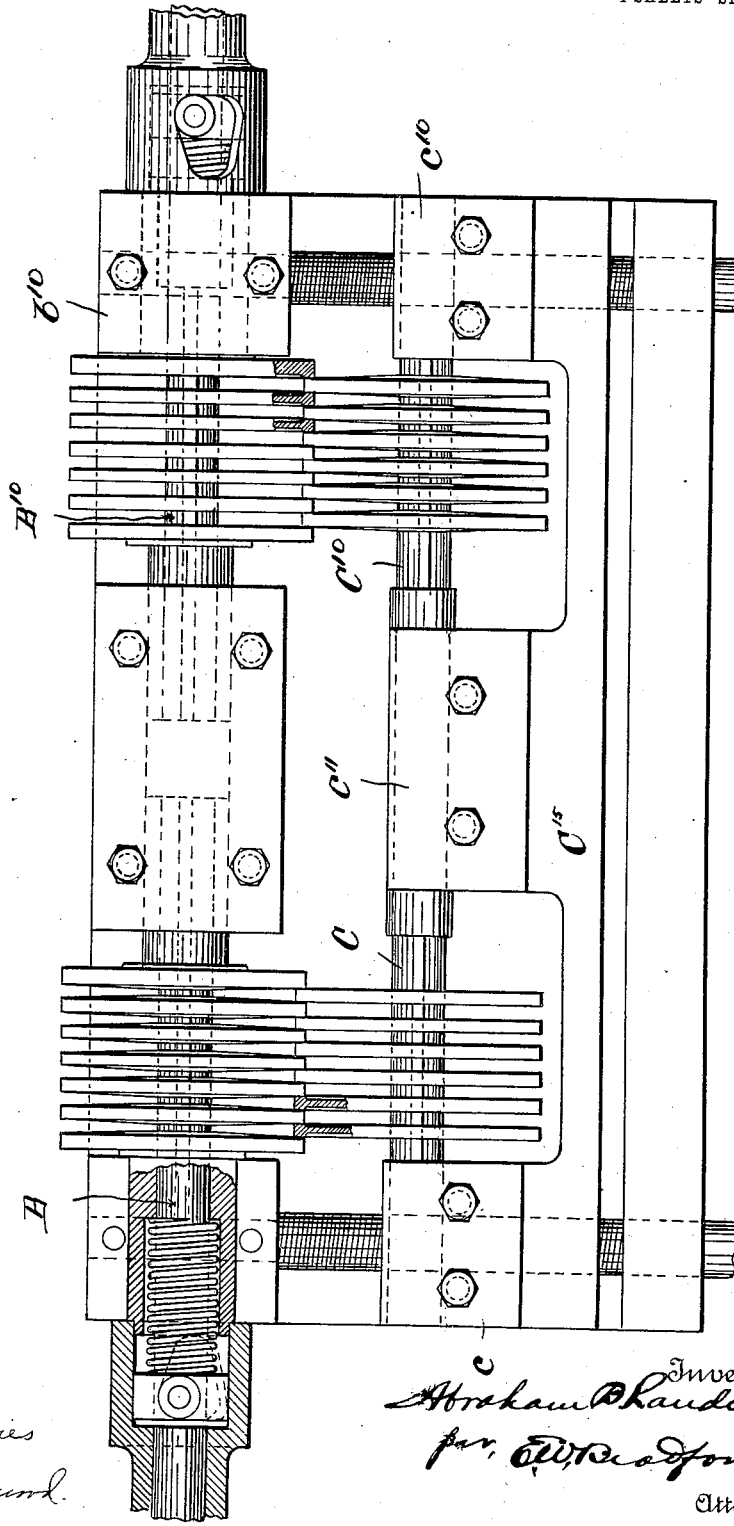

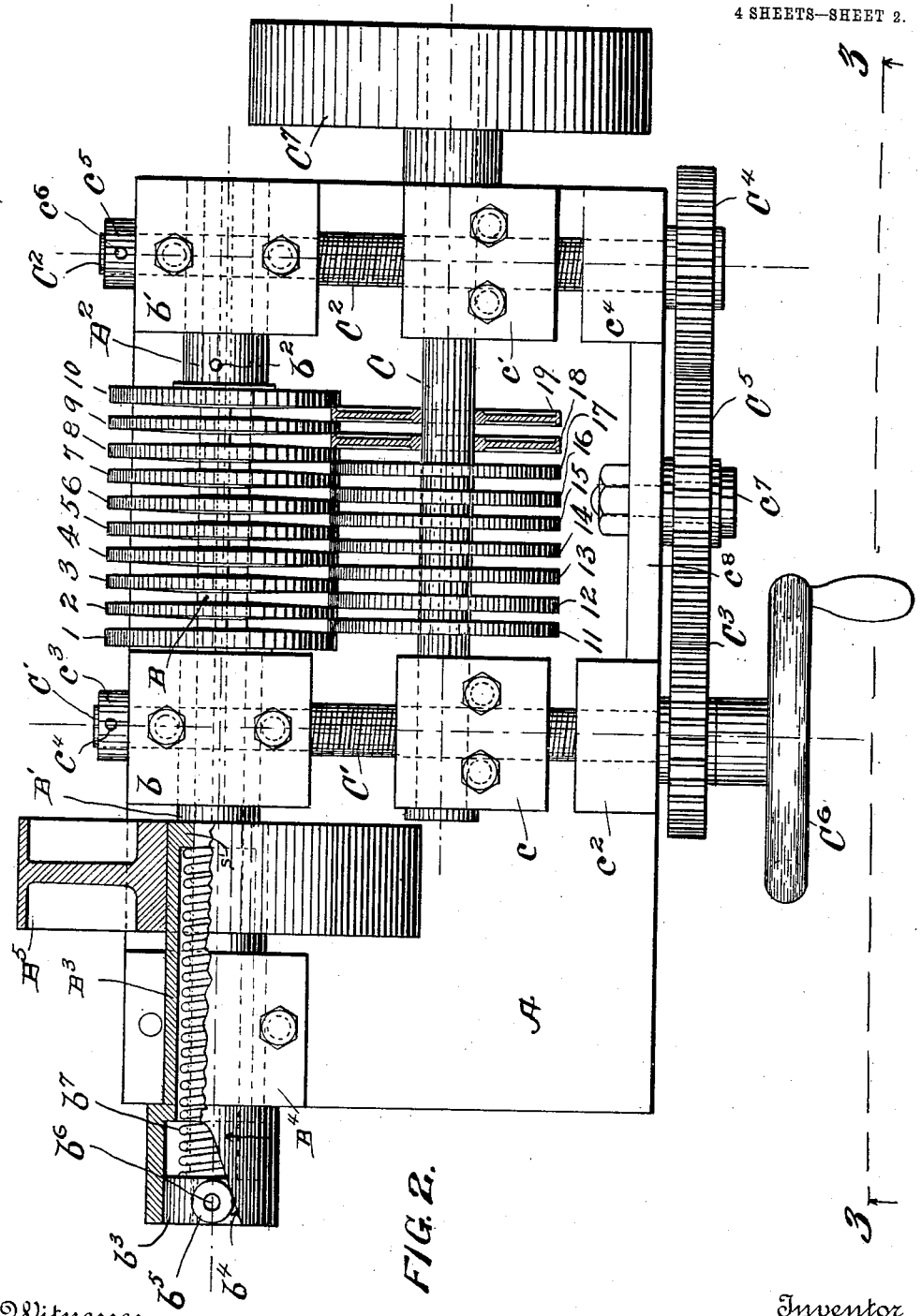

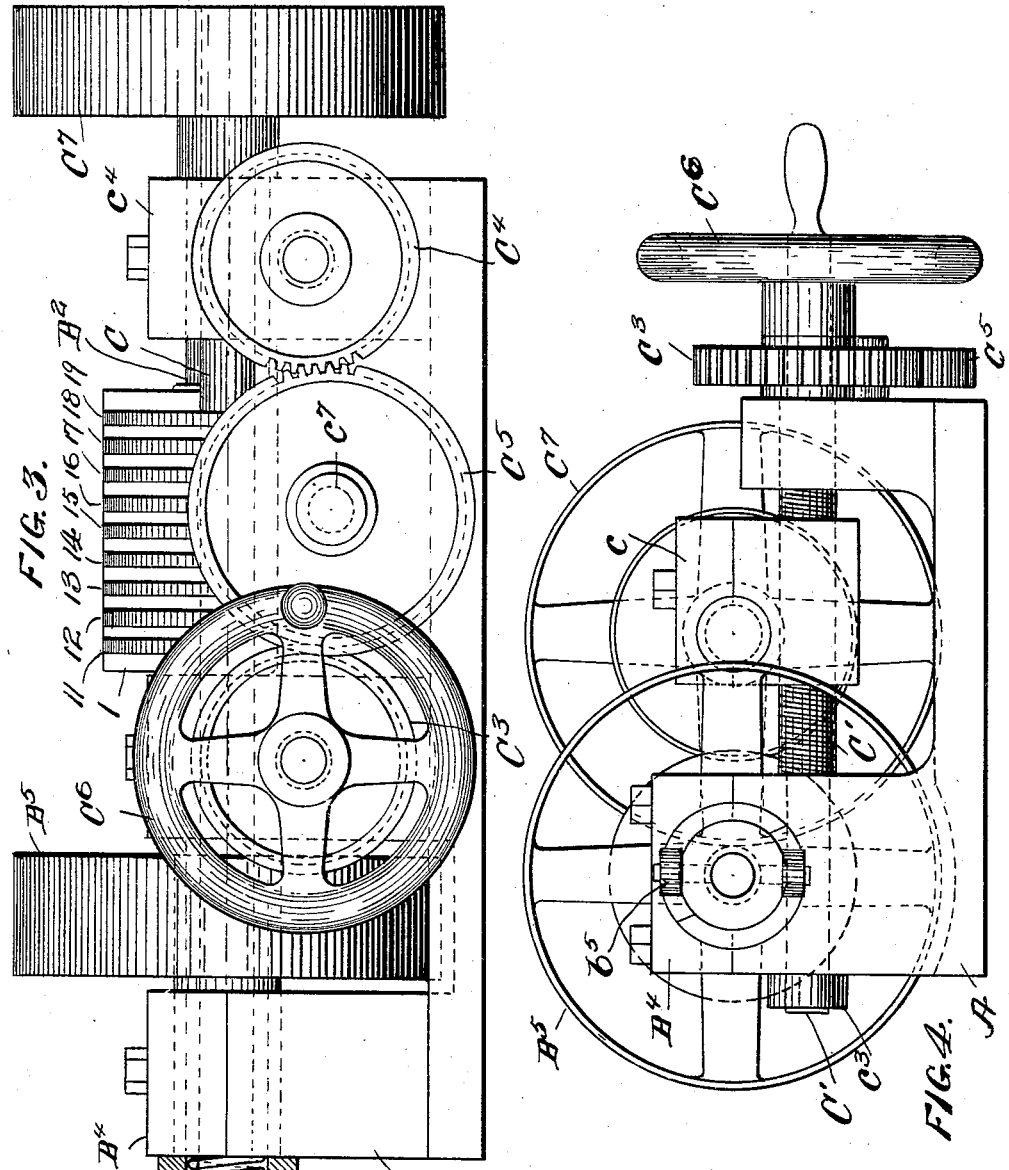

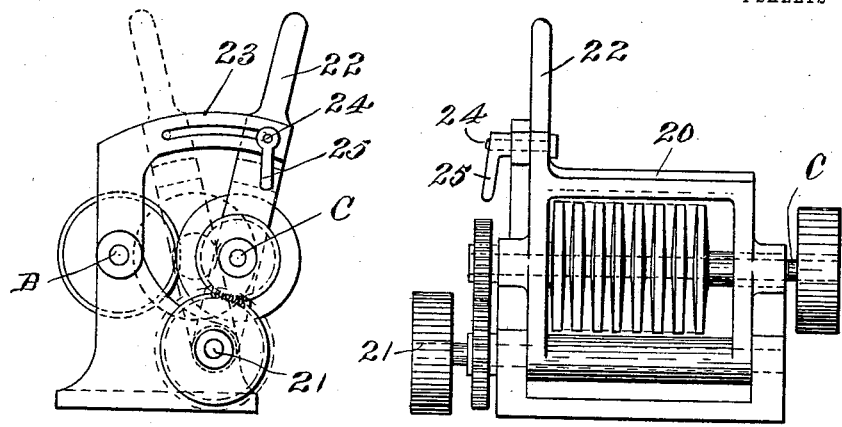

ABRAHAM B. LANDIS, OF WAYNESBORO, PENNSYLVANIA.

CHANGE-SPEED GEARING.

1,017,877.   Specification of Letters Patent.   Patented Feb. 20, 1912.

Application filed October 26, 1907. Serial No. 399,252.

*To all whom it may concern:*

Be it known that I, ABRAHAM B. LANDIS, a citizen of the United States, residing at Waynesboro, in the county of Franklin and State of Pennsylvania, have invented certain new and useful Improvements in Change-Speed Gearing, of which the following is a specification.

In variable speed frictional driving gearing of common construction the power is transmitted by contact between parts having only one or two points of contact, as where two faces bear one against the other or two parts bear on opposite sides of an intermediate part, thus affording only a limited contact surface between the driving and the driven part and requiring high speed and great pressure between the surfaces in order to transmit the required power. Such pressure and speed have a tendency to wear the mechanism rapidly and subject it to great strain which makes the life of such gearing comparatively short and its use expensive because of the continual repairs and renewal of parts required.

The object of my said invention is, therefore, to provide a change speed frictional gearing by which the motion is transmitted by contact between a multiplicity of frictional surfaces which can be indefinitely multiplied according to the power or speed required, whereby great power may be transmitted with a comparatively light pressure between the parts and the wear and strain upon said part thus reduced to a minimum and a gearing provided which will be very durable in use and comparatively inexpensive to maintain; also wherein the change in speed can be adjusted gradually and continually without any jar or undue strain upon the different parts; also which may be used either to connect shafts in line, or parallel shafts, to any number desired; and also wherein the pressure of the frictional contact between the parts will be automatically regulated by the power applied and the load upon said parts, all as will be hereinafter more fully described and claimed.

Referring to the accompanying drawings which are made a part hereof and on which similar reference characters indicate similar parts: Figure 1 is a top or plan view of a change speed gearing embodying my said invention, two sets of transmission gears being shown to illustrate the transmission of power from one set of gears to another, Fig. 2 a similar view showing a single set of driving gears with some of the parts in section to illustrate the construction more clearly and showing the means for adjusting or changing the speed, Fig. 3 a side elevation as seen when looking in the direction indicated by the arrows from the dotted line 3—3 in Fig. 2, Fig. 4 an end elevation as seen when looking in the direction indicated by the arrows from the dotted line 4—4 in Fig. 3, Fig. 5 a detailed cross section, Figs. 6, 7 and 8 views illustrating modified constructions, and Fig. 9 a detail view of one of the parts.

In said drawings the portions marked A represent the bed or frame on which the mechanism is mounted, B a shaft carrying one set of the gears, and C a shaft carrying the other set of gears.

In the description reference will be had mainly to the construction as illustrated in Figs. 2, 3 and 4, inasmuch as the construction shown in Fig. 1 is principally a duplication thereof and will be referred to briefly after the full description of the construction and operation of the single set of gears.

The bed or frame A may be any suitable support for the bearings of the various parts of the mechanism and needs no special description.

The shaft B carries a series of disks 1, 2, 3, 4, 5, 6, 7, 8, 9 and 10. The end disks 1 and 10 are each formed with long hubs or sleeves B' (see Fig. 9) and B², respectively, which extend through bearings $b$ and $b'$ on the bed A, said bearings being arranged on the top of standards near one end of said bed. The hub B² is fastened to the shaft B, to rotate therewith by means of a transverse pin $b^2$ which extends through said hub and shaft. A portion of said hub B² between the disk 10 and the bearing $b'$ is adapted to slide longitudinally in said bearing. The opposite end of said shaft B extends through the hub B' and has a sleeve B³ mounted thereon. The bore in the inner end of said sleeve fits snugly to said shaft, while from near said inner end to near its outer end it is formed of larger diameter and its extreme outer end is of still larger diameter. A collar $b^3$ is secured on the outer end of said shaft and fits within said larger portion of the bore at the outer end of said sleeve. The enlarged outer end of said sleeve is formed with slots in its sides having tapered or cam-faced edges $b^4$. Anti-friction rollers $b^5$ are mounted on short transverse shafts or pins $b^6$ which extend outwardly from opposite sides of said collar. Said rollers are adapted to rest and operate upon said cam faces $b^4$, which are arranged opposite to each other on opposite sides of the shaft. A coiled spring $b^7$ is interposed between the inner face of said collar $b^3$ and the shoulder $s'$ near the inner end of the sleeve $B^3$. Said sleeve $B^3$ is journaled in a bearing $B^4$ in line with the bearings $b$ and $b'$ and has a driving pulley $B^5$ on its inner end and its enlarged outer end abuts against the outer face of said bearing $B^4$ while the outer end of hub $B'$ of the disk 1 abuts against the inner end of said sleeve. All of the disks 1, 2, 3, 4, 5, 6, 7, 8 and 9 are adapted to slide on said shaft B and to permit said shaft to slide through them, being secured thereto by means of splines $s$, as shown in Fig. 5, or the shaft B may be made square, as shown in Fig. 8. The adjacent faces of each of said disks are formed tapered, i. e. the disks are thicker adjacent to the shaft than at their peripheries, the taper being regular and gradual from near the shaft to their outer edges.

The shaft C is mounted in bearings $c$ and $c'$, each of which is provided with a transverse screw-threaded perforation and they are mounted upon screw-threaded shafts $C'$ and $C^2$, respectively. Said shaft $C'$ is journaled at its outer end in a bearing $c^2$ formed in a standard near the front edge of the base A and its other end extends through a transverse bearing in the standard on the top of which is formed the bearing $b$. The portion of said shaft which extends through said standard is provided with a collar $c^3$ which is secured thereto by a transverse pin $c^4$, and holds said shaft from longitudinal movement in one direction, while the inner end of the hub of gear wheel $C^3$ bearing against the outer face of bearing $c^2$ holds it against any longitudinal movement in the other direction. Shaft $C^2$ is similarly mounted in the bearing $c^4$ on the front of the bed and the bearing in the standard on the top of which is formed bearing $b'$ on the rear of the bed, a collar $c^5$ being secured to the outer end of said shaft by means of the pin $c^6$ in the same manner. A train of gearing, consisting of a gear wheel $C^3$ on the shaft $C'$, a gear wheel $C^4$ on the shaft $C^2$ and an intermediate gear wheel $C^5$ on a stud shaft $c^7$ secured on the standard $c^8$ on the front edge of the machine, connects said shafts $C'$ and $C^2$ so that they will operate together and in a uniform direction. As a means for operating said shafts I have shown a hand-wheel $C^6$ on the outer end of shaft $C'$ but, as will be readily understood, this may be connected to any lever or other operating mechanism and extended to any convenient location for the operator. On said shaft C are mounted a series of disks 11, 12, 13, 14, 15, 16, 17, 18 and 19 each of which is adapted to engage between the adjacent faces of two of the disks on shaft B. Each of said disks on shaft C is formed with a rim somewhat thicker than the main body of the disks so that only the thickened portion will contact with the faces of the disks on shaft B and the side edges of said thickened portions are formed tapered to conform to the taper of the sides or faces on the disks on shaft B. Portions of part of said disks are broken away and shown in section in both Fig. 1 and Fig. 2 to illustrate their form more clearly. Said disks are secured on shaft C to slide longitudinally thereof being held by means of splines, in the same manner as illustrated in Fig. 5.

The operation is as follows: The disks on shaft C being in engagement between the faces of the disks on shaft B, as illustrated in Figs. 1 and 2, and power being applied to the pulley $B^5$, the sleeve $B^3$ is turned in the direction indicated by the arrow which causes the cam faces $b^4$, acting on the rollers $b^5$ to force the shaft B and the friction disk 10 keyed thereto toward the friction disk 1 which abuts against the end of bearing $b$, as shown, thus forcing the several disks toward each other and clamping the rims of the disks on shaft C between their adjacent faces. The greater the power applied to said pulley the greater will be the force with which said parts are clamped together and the friction between said parts. By means of the multiplicity of contact faces, however, a comparatively light pressure between them will be sufficient to transmit a comparatively great amount of power. When it is desired to decrease the speed the shaft $C'$ is turned by means of the hand-wheel $C^6$, or other operating means, which through the train of gearing $C^3$, $C^4$ and $C^5$ similarly operates the shaft $C^2$ to force the bearings $c$ and $c'$, carrying the shaft C, toward the bearings $b$ and $b'$ and thus move the points of contact between the two sets of anti-friction disks nearer to the center of the disks on shaft B and decrease the speed while increasing the power transmitted to shaft C. By reason of the taper on the adjacent faces of the disks on shaft B and the narrow radial rims of the disks on shaft C only a small portion of the faces are in contact and the disks on shaft C act as wedges to separate the disks on shaft B, forcing the hub $B^2$ into the bearing $B'$ and separating the disks more widely. While this operation would be difficult with the parts standing still, when they are in rotation it is easily accomplished, the tapered faced disks rolling around the wedge-shaped rims and "walking" apart without binding. When it is desired to increase the speed, shaft $C'$ is turned in the opposite direction drawing shaft C away from shaft B and the spring $b^7$ will operate to draw shaft B longitudinally to keep the faces of the two sets of disks in contact. Shaft C is provided with a pulley $C^7$, or other gear, by which the power or motion may be transmitted as desired.

In Fig. 1 I have shown the construction practically duplicated, the shafts C and B being mounted and arranged as above described. Another shaft $B^{10}$ is mounted in line with shaft B and shaft C is extended through a central bearing $C^{11}$ and has its opposite end $C^{10}$ journaled in a bearing $c^{10}$. The end $C^{10}$ may be made a part of shaft C or coupled thereto. The screw-shafts for operating the shaft C—$C^{10}$ connect with the bearing blocks $c$ and $c^{10}$, which, with the middle bearing $c^{11}$, are all mounted on a single frame $C^{15}$. On shaft $C^{10}$ disks corresponding to those on shaft B are arranged and on shaft $B^{10}$ disks corresponding to those on shaft C. Power is thus transmitted from shaft B to shaft C—$C^{10}$ and then transmitted to shaft $B^{10}$ from which it may be transmitted to the mechanism it is desired to drive. The operation is the same as described for the single construction and it is thought the construction and arrangement of parts will be fully understood from an inspection of Fig. 1 in view of the foregoing description.

It will be understood, of course, that additional sets of gears may be added in the same manner to any limit desired.

By means of having a multiplicity of the inter-engaging disks a greater frictional power with weaker force of contact is secured and greater durability obtained, as will be readily understood, and a more flexible and more easily adjusted mechanism provided, while the transmission of great power without danger of slipping is insured. The sliding disks and tapered faces with the means provided for throwing them toward each other by the load applied also provides for automatically regulating the force of contact as may be required by said load.

In Figs. 6 and 7 I have illustrated different means for adjusting the shaft C toward and from the shaft B, which consists in mounting said shaft C in a swinging frame 20 hinged on a shaft 21 mounted in suitable bearings on the frame and having a handle 22 by which it may be swung on said pivot to vary the distance between shafts C and B. A segmental slot is provided in an overhanging arm 23 secured to the frame and a locking-bolt 24, provided with a lever-nut 25, extends through said slot and the handle 22, by which means said frame 20 may be clamped rigidly in any position at or between the two extremes shown by whole lines and dotted lines in Fig. 6.

Various other modifications of the construction may be made without departing from my invention, as will be readily understood.

Having thus fully described my said invention, what I claim as new and desire to secure by Letters Patent, is:

1. A change speed gearing comprising a driving and a driven shaft, a series of disks slidably mounted upon each shaft and arranged with those on one shaft engaging between the adjacent faces of those on the other shaft, means for clamping said disks by a force automatically adjusted to the load, one of said shafts being mounted in adjustable bearings, said bearings, and means for adjusting said bearings to carry the shaft therein toward and from said other shaft, substantially as set forth.

2. In a change speed gearing, the combination, of the driving shaft, a series of disks mounted to have a longitudinal movement thereon and formed with their adjacent faces tapered from a thick part adjacent to said shaft to a thinner outer edge, a driven shaft mounted in adjustable bearings parallel with said driving shaft, said bearings, a series of disks mounted thereon to have a longitudinal movement and arranged to engage between the faces of the disks on the driving shaft, means for varying the clamping force between said disks as the load varies, and means for adjusting the bearings of said driven shaft to vary the distance between said two shafts, substantially as set forth.

3. In a change speed gearing, the combination, of a driving shaft, a driven shaft, a set of longitudinally movable disks upon each of said shafts, those upon one shaft being adapted to engage between the adjacent faces of those upon the other shaft, means for automatically varying the clamping force between said sets of disks as the load varies, and means for adjusting one of said shafts toward and from the other, substantially as set forth.

4. In a change speed gearing, the combination, of a driving shaft, a driven shaft, a series of slidable disks mounted upon each of said shafts to rotate therewith, one set of said disks adapted to engage between the adjacent faces of the other set, the set of disks serving as the clamping disks being tapered on their adjacent faces and the disks arranged between said clamping disks being formed with rims wider than the main thickness of the disk, said rims having faces tapered correspondingly to the taper of the clamping disks, substantially as set forth.

5. In a change speed gearing, the combination, of the driving shaft having a series of slidable disks mounted thereon, said disks, the two end disks being formed with elongated hubs which extend through the bearings and serve as journals, said bearings, a sleeve mounted on the outer end of said shaft carrying the driving wheel, said sleeve formed with a cam-face in its side engaging with a transverse engaging part on said shaft, said driving wheel, a driven shaft having a series of disks engaging between the faces of the disks on said driving shaft, and said series of disks on the driven shaft, substantially as set forth.

6. In a change speed gearing, the combination, of the driving shaft, a series of disks mounted to have a limited longitudinal movement thereon except one end disk which is mounted fast on said shaft, both of the end disks being formed with elongated hubs adapted to rest in bearings provided therefor and support said shaft, said bearings, anti-friction rollers on the outer end of said shaft, a sleeve surrounding said shaft formed with slots in its opposite sides with cam-edges with which said rollers are adapted to engage, the driving pulley mounted on said sleeve, the driven shaft mounted adjacent to said driving shaft, a series of disks on said driven shaft engaging between the faces of the disks on said driving shaft, and means for adjusting one of said shafts to vary the distance between them, substantially as set forth.

7. In a change speed gearing, the combination, of the driving shaft, a series of disks mounted thereon to have a limited longitudinal movement except one end disk which is rigidly secured thereto, each of said end disks being formed with elongated hubs adapted to serve as journals and mounted in bearings provided therefor, the adjacent faces of said disks being formed tapered, said bearings, a driven shaft alongside of said driving shaft mounted in adjustable bearings, said adjustable bearings, a series of disks on said driven shaft adapted to engage between the adjacent faces of the disks on said driving shaft, means for adjusting said bearings toward and from the bearings on the driving shaft, a sleeve on the outer end of said driving shaft adjacent to the hub of the end disk adjacent thereto, a driving pulley on said sleeve, a collar on the outer end of said shaft, a spring interposed between said collar and a shoulder at the rear end of said sleeve, anti-friction rollers on radial journals on opposite sides of said collar, said sleeve being formed with slots on opposite sides having cam-shaped edges with which said anti-friction rollers engage, substantially as set forth.

8. In a change speed gearing, the combination, of the driving shaft, a set of disks mounted thereon to have a sliding movement, a spring adapted to hold said disks toward each other, a driving pulley mounted on a sleeve surrounding said shaft, a cam engagement between said sleeve and shaft whereby the application of the power to said pulley will tend to draw said disks together, the driven shaft, and a series of disks slidably mounted on said driven shaft and arranged to engage the disks on said driving shaft, substantially as set forth.

9. In a change speed gearing, the combination, of the driving shaft, a series of slidably mounted disks thereon, the driving pulley mounted to have a limited movement independent of said shaft, and connected to said shaft by a cam engagement, whereby the application of power to said pulley will tend to draw said disks together, the driven shaft, and a series of disks on said driven shaft arranged to engage with the disks on said driving shaft, substantially as set forth.

10. In a change speed gearing, the combination, of the driving shaft, the driving gear mounted thereon and connected thereto by a cam engagement, a series of disks slidably mounted on said shaft, the driven shaft, and a series of disks thereon arranged to engage with the disks on said driving shaft, substantially as set forth.

11. In a change speed gearing, the combination, of the driving shaft, the driving gear mounted thereon and connected thereto by a cam connection, a series of disks slidably mounted thereon, a hub or collar outside of the end disk locked to the shaft, a driven shaft, and a series of disks mounted on said driven shaft engaging with the disks on said driving shaft, substantially as set forth.

In witness whereof, I, have hereunto set my hand and seal at Washington, D. C., this 18th day of October, A. D. nineteen hundred and seven.

ABRAHAM B. LANDIS. [L. S.]

Witnesses:
E. W. BRADFORD,
ANNA M. SMALLWOOD.

---

Copies of this patent may be obtained for five cents each, by addressing the "Commissioner of Patents, Washington, D. C."